Patented May 14, 1935

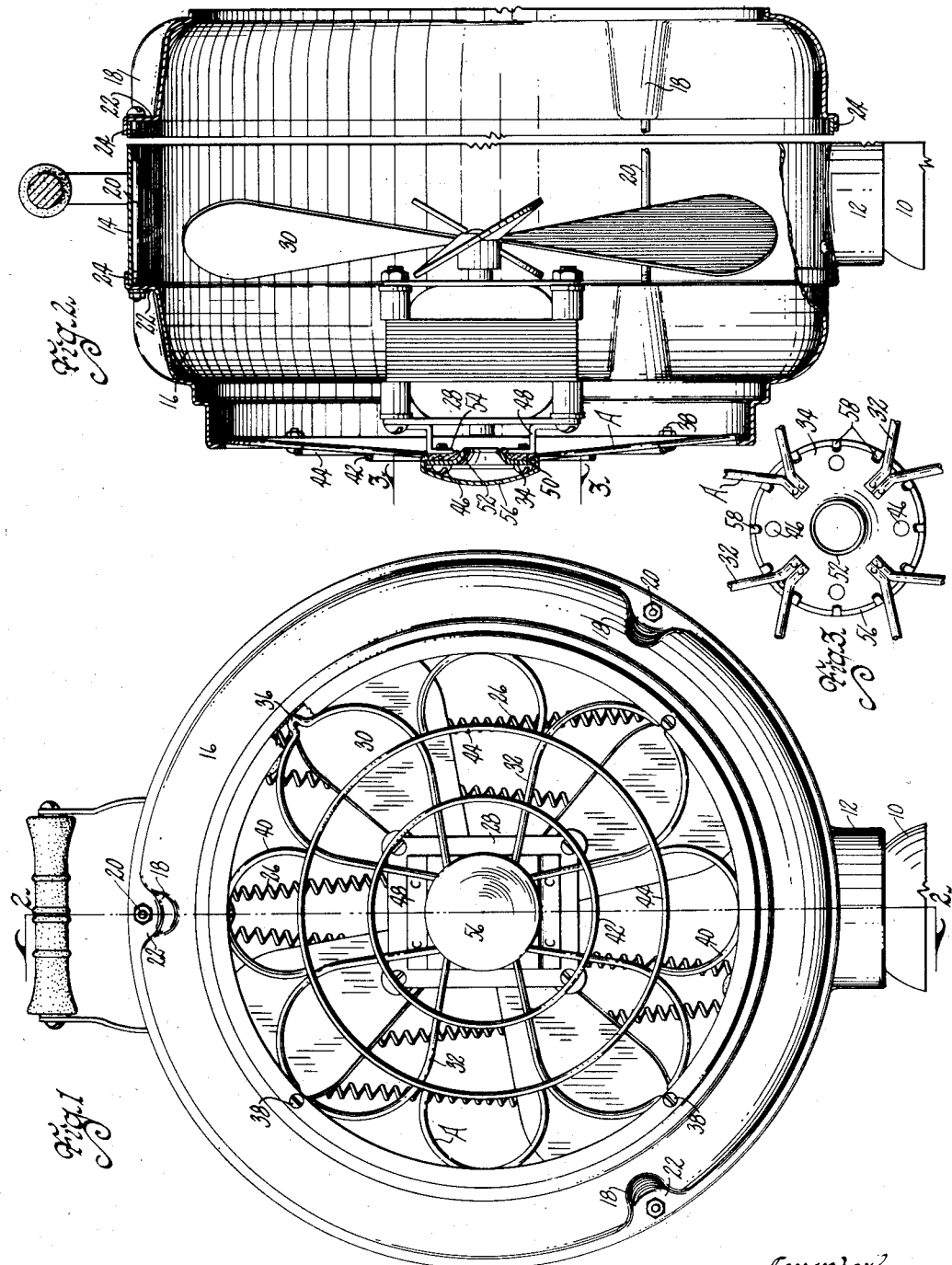

2,001,151

UNITED STATES PATENT OFFICE 2,001,151

MOTOR SUPPORT FOR AIR CIRCULATORS AND HEATERS

Eugene Newnham, St. Louis, Mo., assignor to Knapp-Monarch Company, Belleville, Ill., a corporation of Missouri Application December 19, 1932, Serial No. 647,859

3 Claims. (Cl. 230—273)

The object of my invention is to provide a motor support for an air circulator and heater which is simple, durable and comparatively inexpensive to manufacture.

A further object is to provide a support for a fan motor, such as is used in an air circulator and heater disclosed in the Ernest S. Johnson application for patent, Serial No. 568,548, filed October 13, 1931.

Still a further object is to provide a support for a fan motor which prevents the vibration of the motor being imparted to the casing of the air heater and circulator and which serves the combination purpose of a motor support and guard for the fan blades of the motor.

Still a further object is to provide a motor support in the form of a grid-like member made of resilient wire, such as iron, steel or brass wire, and arranged with a plurality of spokes and annular rings connecting the spokes together, the entire support being slightly cone shaped and fastened at its periphery to a casing with the fan motor being fastened to the center of the support.

Still a further object is to provide a novel arrangement for securing the motor to the support and covering the heads of the screws which serve as a connecting means between the motor and the support.

Another object is to provide a novel means for securing parts of the air circulator and heater casing together.

With these and other objects in view my invention consists in the construction, arrangement and combination of the various parts of my device, whereby the objects contemplated are attained, as hereinafter more fully set forth, pointed out in my claims and illustrated in the accompanying drawing, in which:

Figure 1 is a rear elevation of an air circulator and heater with my motor support applied thereto, the base of the device being omitted to conserve space on the drawing.

Figure 2 is a vertical sectional view on the line 2—2 of Figure 1, parts of the casing being broken away to conserve space; and Figure 3 is a sectional view on the line 3—3 of Figure 2.

On the accompanying drawing, I have used the reference numeral 10 to indicate a ball member which is mounted on the base, not shown, the same as in the Johnson application hereinbefore referred to. A socket member 12 coacts with the ball member 10, whereby the inclination of the air circulator and heater may be adjusted for directing the circulating and heated air as desired.

The socket 12 is secured to an annular band 14, which together with the cupped end members 16 and 18 form an air circulator and heater casing. Bolts 20 are provided for retaining the cupped end members and the band in assembled relationship. The bolts extend through shoulders 22 which engage the ends of the band 14. Flanges 24 extend over the periphery of the band to position the band and the end members relative to each other. The bolts 20 extend along the inner surface of the band 14. The band is confined between the flanges 24 and the bolts 20 due to the construction just set forth.

The cupped end member 18 is adapted to support an electric heating element 26 in any desired manner. The manner of support does not form any part of my present invention and accordingly is not shown in Figure 2.

The air circulator comprises a motor 28 and fan blades 30 thereon. In supporting the motor relative to the casing of the device, it is desirable to prevent vibration of the motor being imparted to the casing. Therefore a suitable support is desirable.

I have provided a motor support A in the form of spokes 32 having their inner ends spot welded or otherwise secured to a disc 34 and the outer ends looped as indicated at 36 and secured by bolts 38 to the end member 16. Additional elements 40 and annular rings 42 and 44 are spot welded to the spokes 32 to form a grid-like member which serves as a guard to prevent anyone from accidentally thrusting their fingers into the fan blades 30.

Referring to Figure 2, it will be seen that the general cross section of the support A is slightly cone shaped. I find this somewhat strengthens the support, which is made of slightly resilient wire so that it supports the motor 28 rigidly enough to keep it in its proper position yet permits its vibration without such vibration being transmitted through the support to the casing.

The support is secured to the motor 28 by screws 46 extended through the disc 34 and into a bracket 48 on the motor. A washer 50 of asbestos or the like may be interposed between the disc and the bracket to fill the space between the inner ends of the spokes 32. The disc is provided with a central hub 52 adapted to enter a bore 54 in the bracket 48.

In order to cover the heads of the screws 46, I provide a cover plate or disc 56 having ears 58 adapted to be bent over the edge of the disc 34.

The support A can be fabricated in a variety of shapes other than the one specified on the drawing. Such a change, as well as others, may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:—

1. A fan motor support comprising a grid member adapted to serve both as a support and as a guard for the fan blades of a fan motor, said motor support having a disc secured to the center portion thereof, means extending through said disc for attaching said motor thereto, a cover plate for said means, said cover plate having ears bent over the edge of said disc.

2. In an air circulator and heater, a casing comprising a band, a pair of cupped end members having shoulders engaging the ends thereof and flanges overlapping the periphery thereof, and means extending through said shoulders located inside of said band and extending from one shoulder to the other one to retain said end members in position.

3. In an air circulator and heater, a casing comprising a band, a pair of cupped end members having shoulders engaging the ends thereof and flanges overlapping the periphery thereof, and bolts each extending through both of said shoulders and engaging the interior surface of said band to retain it in position against said flanges.

EUGENE NEWNHAM.